United States Patent [19]

Friend

[11] 4,184,280
[45] Jan. 22, 1980

[54] METHOD OF FISHING USING A SLIP-RING FISHING DEVICE

[76] Inventor: Leroy Friend, 1611 S. Oakwood, Peoria, Ill. 61605

[21] Appl. No.: 885,293

[22] Filed: Mar. 10, 1978

[51] Int. Cl.² ............................................. A01K 69/00
[52] U.S. Cl. ..................................... 43/4.5; 43/27.2
[58] Field of Search ................... 43/4.5, 27.2, 43.1, 43/44.92, 44.95, 44.98, 44.84, 44.85

[56] References Cited

U.S. PATENT DOCUMENTS

| | | | |
|---|---|---|---|
| 1,246,251 | 11/1917 | England | 43/27.2 X |
| 2,494,012 | 1/1950 | Stricker | 43/43.1 X |
| 2,550,282 | 4/1951 | McAvoy | 43/27.2 X |
| 2,857,704 | 10/1958 | Yamada | 43/44.85 |
| 3,164,922 | 1/1965 | Kearns | 43/44.85 X |
| 3,491,477 | 1/1970 | Karras | 43/44.84 |

Primary Examiner—Nicholas P. Godici
Attorney, Agent, or Firm—Polachek, Saulsbury & Hough

[57] ABSTRACT

In a preferred embodiment, a fishing line has a weight attached to a lower end thereof, with the upper end of the line typically attached to a pole or rod & reel operatively, and the line has snapped thereonto a slip-ring slidable down the length of the line from the upper end of the line to the weighted end in the water in use, and with a leader and hook with bait suspended from the slip-ring, the slip-ring being of a size sufficiently small that it does not slip-over the weight.

1 Claim, 5 Drawing Figures

METHOD OF FISHING USING A SLIP-RING FISHING DEVICE

This invention relates to a novel fishing unit and a method of use thereof.

BACKGROUND TO THE INVENTION

Prior to the present invention, there has been a practical difficulty in the utilization of a multiplicity of lines without having present the problem of the tangling of lines, as well as the handling of the hook being complicated by the suspended line which often tangles, or at least must be concurrently held while baiting the hook or the like. In the past, most fishing rigs or fishing units are complicated to understand or handle or both, as well as costly.

SUMMARY OF THE INVENTION

Accordingly, objects of the present invention are to over-come difficulties and deficiences of prior fishing rigs and methods and disadvantages, and to obtain a novel combination together with a novel method of use thereof and associated novel advantages.

Another object is to obtain a fishing unit of several simple parts which have advantages not heretofore available, enabling improved flexibility in effective fishing with a plurality of lines concurrently.

Another object is to obtain a fishing unit of simple design and operation, for achieving above-noted objects.

Another object is to obtain prior objects while being able to utilize normally standardly available fishing supplies for easy use with the practice of the present invention.

Other objects become apparent from the preceding and following disclosure.

One or more of preceding objects are obtained by the invention embodiments and method(s) typically illustrated and explained hereinafter as mere illustrative embodiments of the invention set forth to improve understanding of the invention, but in no way limiting the invention to the merely illustrative examples which are not intended to limit the scope of the invention which extends to obvious variations and modifications thereof within ordinary skill of the artisan in this field.

Broadly the invention may be described as a length of fishing line with a sinker or weight at the far or distal end thereof normally lowered or tossed into the body of water for the fishing, and a slip-ring element and mechanism thereof for uninhibited slipping from an upper or close or proximal end of the fishing line downwardly toward and substantially to the distal end thereof abovenoted, with the mechanism of the slip-ring element providing for suspending or the mounting of a hook element such as a conventional hook or lure or the like thereon. The fishing line is characterized by having no obstruction of a size sufficiently large as to inhibit substantially or prevent the sliding of the hook and slip-ring element on which it is mounted, from freely slipping downwardly along the line, or working-itself downwardly toward the line's distal weighted end upon slight jerks or shaking of the proximal end of the line.

In a preferred combination, the hook element is a part of the combination as a prepared unit, adding to the simplicity and thus the improved utility of the invention, particularly for those who are less proficient in the handling of fishing gear, as noted in the background and objects above.

Preferably the slip-ring and mechanixm thereof include a snap-ring element of a structure and configuration such that it may be opened and closed alternately, around the fishing line, and in the closed state when snapped around the fishing line may be slid along the fishing line downwardly from the proximal end of the fishing line toward the weighted normally lower and distal end of the fishing line.

As in normal pole or rod and reel fishing, a preferred embodiment of the invention includes the proximal end of the fishing line being of a size and texture and physical make-up such that it may be easily attached to the support such as the pole or reel; but also, the proximal end of the line may be easily and preferably looped or containing some loop element at that end thereof adapted to be easily hooked-over a nail, or snapped-onto some retaing or anchoring support such as a part of a boat or skiff. Accordingly, it is thereby possible to practice a preferred embodiment of the invention, namely the anchoring of a plurality of lines around the periphery of a craft, or more or less centrally, and tossing-out the several weighted lines in substantially radially or spreading array, such that there is no significant possibility of a tangling of lines, which each by virtue of its weight becomes substantially stationarily or permanently anchored to a specific point relative to all others; thereafter, a separate slip-ring element is mounted on each of the plurality after the baiting (if bait is utilized) of the hook mounted on the slip-ring element, and the slip-ring elements are each worked-downwardly or permitted to slip downwardly along the respective fishing lines toward the weight(s) at the lower proximal ends thereof. In this manner, several fishing line properly positioned may be "out" concurrently. Only when the bait is to be checked, or when there is a bit, need the line be pulled-in or reeled-in.

Accordingly, as an embodiment of the invention, there is also a method which includes the placing of the slip-ring or slip-ring element, around a fishing line having a weight mounted at the distal end of the fishing line; and includes the supporting of the fishing line at a proximal end of the fishing line; and includes further the attaching of a hook element to the slip-ring; and includes further the placing of the weight and distal end of the line attached-to the weight, deeply into a body of water; and includes thereafter the slipping downwardly of the slip-ring along the fishing line toward the weight.

THE FIGURES

Figure 2:
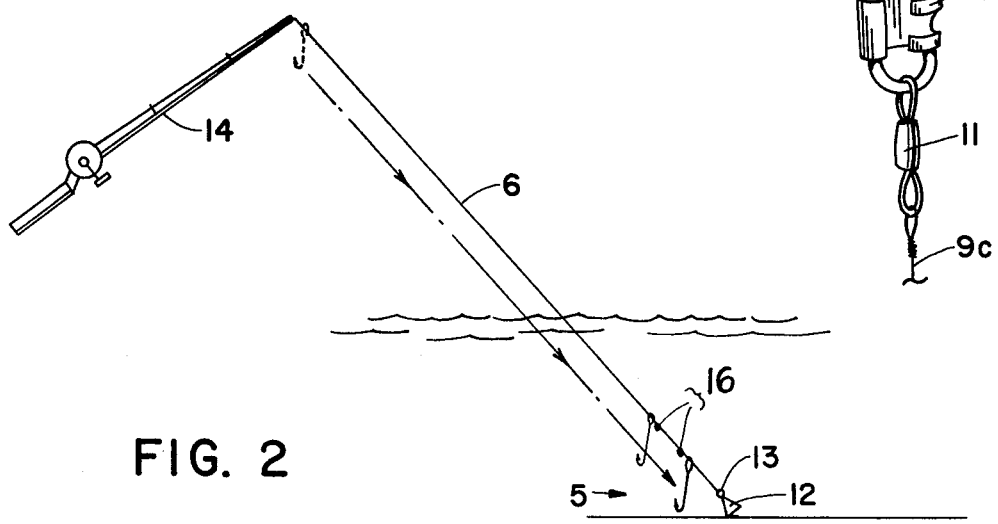

FIG. 2 illustrates diagrammatically a rod and reel having the inventive fishing line and weight thereof, and the snapped-on slip-ring element, with the mounted hook element, as an operative unit in side view as would appear symbolically with the lower and distal end of the weighted line tossed into deep water with the weight resting on the bed of the body of water therein illustrated, with the slip-ring element positioned slightly above the weighted-end of the line.

Figures 1A, 1B, 3, 4:
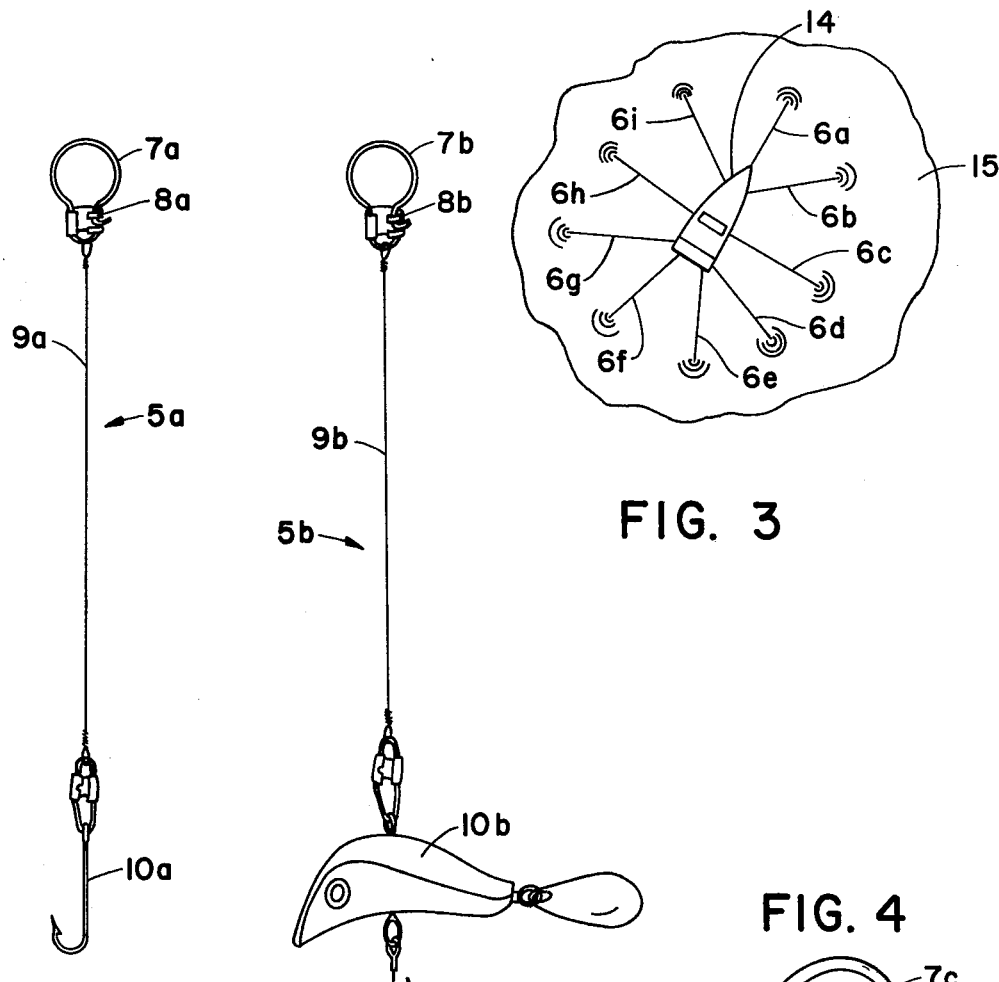
FIG. 1A illustrates a side view of a slip-ring element having a lure-leader ahd hook element suspended or mounted thereon.
FIG. 1B illustrates the same as FIG. 1A, except that a lure or artificial bait with hooks thereof, is suspended or mounted thereon.

FIG. 3 illustrates symbollically a boat from top view, with diagrammatically the plurality of lines of this invention tossed-out in a spreading array, around the periphery of the vessel(boat), into the illustrated body of water.

FIG. 4 illustrates in an enlarged view, a slip or snap-ring element and mechanism and attachments thereof, of the same or general type shown in FIGS. 1A and 1B, in side open-state view.

DETAILED DESCRIPTION

It should be recognized that it is not inconsistent with the present invention, and is within the concept and scope thereof, to include nominal barriers along the line, such that upon the working-of the line the slip or snap-ring is able to slip-over or slide-over the barrier to move-downwardly the line to the desired-point there-along. In like manner, it is within the scope and concept of the invention to have a total barrier to further slipping downwardwardly of the slip-ring element beyond a point which is desired to be the lowest point-of-location of the slip-ring and attached hook and bait. In like manner, where desired, a plurality of serially-arranged barriers, or even a single barrier, of the type that a slip-ring may be caused to work-over or slip-over, may be included toward a distal end of the fishing line in order to utilize a plurality of slip-rings (and hook and bait attached thereto) on a single line, by placing on a first, working it down to a desired point beyond the barrier, and thereafter putting-on another slip-ring and working it down to a point of the barrier, but not below the barrier; with a plurality of serially arranged barriers 16, a plurality of several consecutive slip-rings and hooks and baits thereof may be fished on a single line concurrently, as shown in FIG. 2, & slide-direction. Accordingly, slip-ring fishing is a new way to fish. The idea is to cast a line with a sinker or weight attached to the end of the line, out into the lake, river or other body of water. Then slip the ring, which has a leader for live bait or a lure attached, over the line. The live bait will work itself down the line, the slip-ring slipping down the line to the movement of the bait, substantially to the sinker or weight. The lure, with a slight twitch of the pole and/or line will work its way to substantially a lower end of the line to the sinker or weight, the slip-ring slipping down the line with and upon movement of the pole and line. When a line is retrieved, the leader or lure is thereupon snapped-off the line by opening the slip-ring, and thereafter repeating the cast(s) and snapping-on of the ring(s). Preferably each of a plurality of substantially concurrent consecutive casts of several different lines, should proceed in either a clockwise or in a counter-clockwise direction from previous casts.

With reference to the above-noted Figures, the invention may be better understood.

In FIGS. 1A and 1B, respectively, there are illustrated slip-ring and hook element and mechanisms 5a and 5b, of which there is an attachable and alternately detachable snap-ring 7a and 7b respectively, snapped around snap-element 8a and 8b respectively, for the snapping as unit 5 (FIG. 2) around and onto the fishing line 6, shown in FIG. 3 as a plurality of lines 6a, 6b, 6c, 6d, 6e, 6f, 6g, 6h and 6i typically, thrown from a boat 14 into the surrounding body 15 of water. Further in FIGS. 1A and 1B, there is shown the leader 9 attached to the slip-ring mechanism, designated 9a and 9b respectively, and the FIG. 1A hook 10a and the FIG. 1B lure 10b with hooks supported thereby.

FIG. 2 further discloses an embodiment of rod and reel, with the weight or sinker 12 at the lower and proximal end 13 of the fishing line 6, with the proximal end of the line 6 being operatively illustrated and mounted on the reel and rod 14, with the lower end of the line and the sinker and hook and slip-ring mechanism 5 at the submerged end of the line 6 within a symbolically-illustrated body of water having a fish and crab swimming therein diagrammatically.

FIG. 4 illustrates the corresponding parts discussed for the slip-ring and mechanisms of FIGS. 1A and 1B, as the snap-ring 7c and snap-element 8c, and swivel-connector 11, and leader 9c, shown in part.

It is to be understood that the illustrated embodiments are not all-inclusive of the scope of the invention, but to improve understanding of the nature of the invention, and that the invention includes variations and modifications and substitution of equivalents obvious to a person skilled in this particular field.

I claim:

1. A method of fishing comprising: employing a slip-ring of substantially annular structure having inside-diameter inner-bearing surfaces forming uniformly large through-space at all points being of a size sufficiently large such that the slip-ring is slidable over any one of a plurality of line-mounted barriers in response to an undulation of said line fishing line, including placing the slip-ring around a fishing line having a weight at a distal end thereof and having a plurality of said line-mounted barriers as serially arranged barriers arranged and located between the proximal and distal ends of the fishing line substantially at and spaced-away from said distal end; supporting the fishing line at a proximal end thereof; attaching a hook element to the slip-ring; placing the weight and distal end deeply into a body of water substantially below a level of said proximal end; placing the slip-ring over the line and allowing the slip-ring to slide down the line to said plurality of line-mounted barriers; causing the fishing line to undulate sufficiently for the slip-ring to slip-over an adjacent one of said line-mounted barriers downwardly along the fishing line toward said weight.

* * * * *